Dec. 7, 1937.  T. HALL  2,101,578
CANDELABRA
Filed Feb. 25, 1936   3 Sheets—Sheet 1
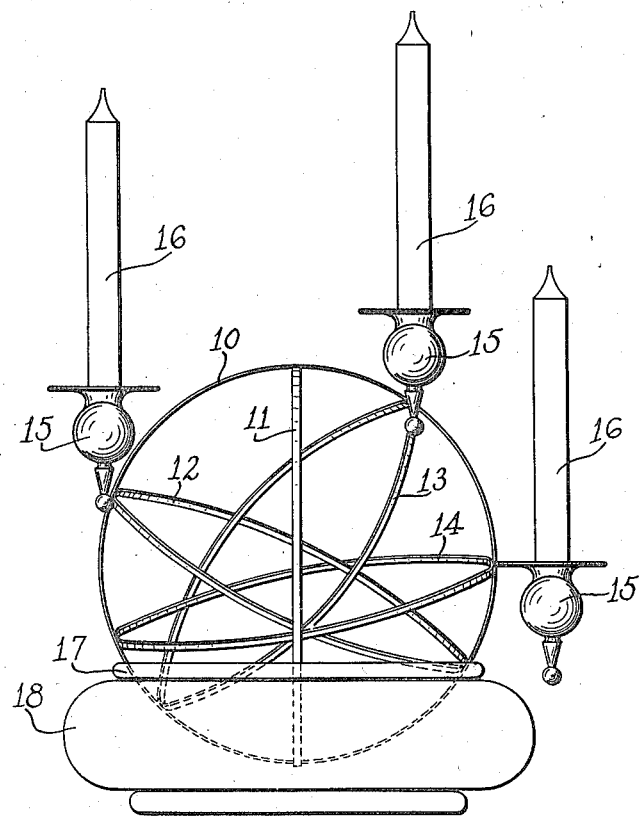
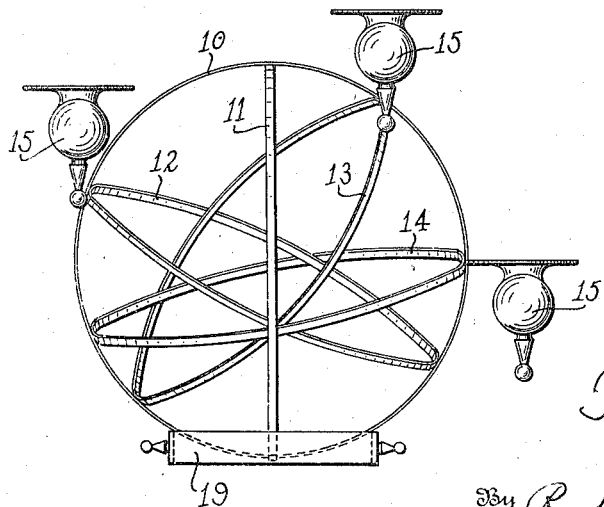

Dec. 7, 1937. T. HALL 2,101,578
CANDELABRA
Filed Feb. 25, 1936 3 Sheets-Sheet 2
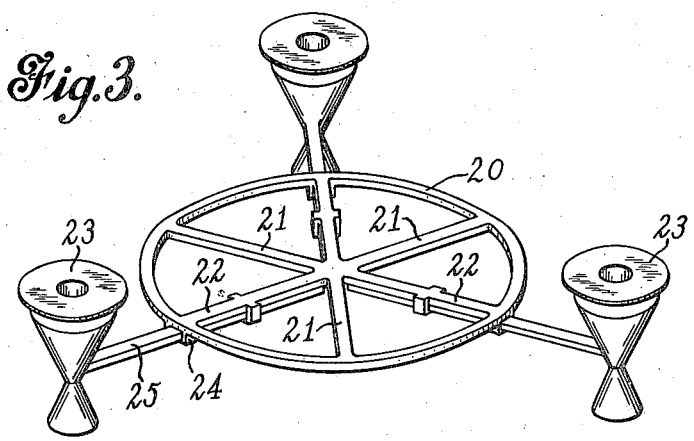
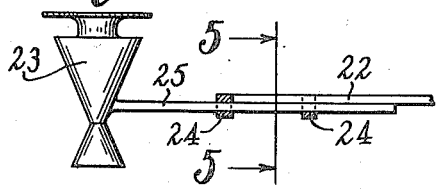
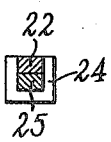
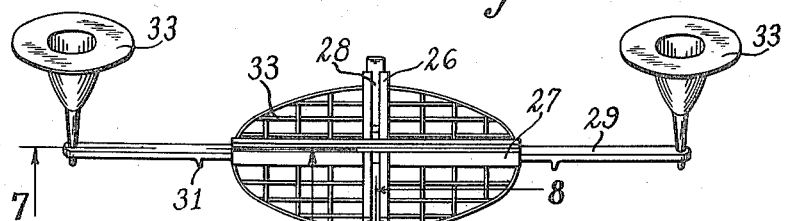
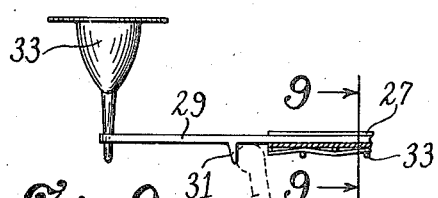
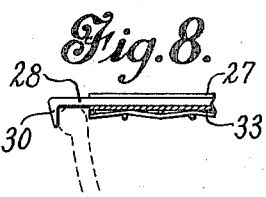
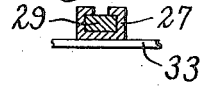
Inventor
Tom Hall
By Rockwell Bartholow
Attorneys Dec. 7, 1937.            T. HALL            2,101,578
CANDELABRA
Filed Feb. 25, 1936        3 Sheets-Sheet 3

Inventor
Tom Hall
By Rockwell Batchelor
Attorneys

Patented Dec. 7, 1937

2,101,578

UNITED STATES PATENT OFFICE 2,101,578

CANDELABRA

Tom Hall, New York, N. Y., assignor to Charles S. Robinson, Sandy Hook, Conn.

Application February 25, 1936, Serial No. 65,642

14 Claims. (Cl. 240—2)

My invention relates to candelabra, and more particularly to a combined candelabra and flower holder or support for the stems of flowers, which is designed to be supported from the upper edge of a bowl or vase containing flowers, whereby the flower stems may project upwardly through the structure of the candelabra and be supported thereby in a more or less upright position, so that the flowers themselves will be supported adjacent the candle sockets.

In many instances it will be found desirable to provide an ornamental centerpiece or the like which will comprise both candles and flowers, and it is contemplated by my invention to provide a novel and ornamental structure which may be supported either upon its own base or upon the upper edge of a flower bowl or vase, the latter serving in such case as the base for the candelabra. Preferably the candle sockets will be provided in spaced positions upon the candelabra, and the latter is preferably, at least in part, a skeleton or openwork structure so that the flower stems may project upwardly between the parts thereof and be supported thereby between and around the candles.

One object of my invention is the provision of a novel and improved candelabra having provision for supporting candles, and also for supporting flower stems.

Another object of the invention is the provision of a candelabra of the character described which may be supported upon or within the upper edge of a flower bowl or vase.

A further object of the invention is the provision of a candelabra of the character described such that it may be supported upon the upper edge of a flower bowl or vase, or may be used alone, in which case it is designed to rest upon a base or support provided therefor.

A still further object of the invention is the provision of a candelabra of the character described such that it may be adjustable to flower containers of different sizes.

A still further object of my invention is the provision of a candelabra of openwork structure, which may have the candle sockets provided upon the outer portions of the structure or adjacent the central portion of the structure, as desired.

To these and other ends the invention consists in the novel features and combinations of parts to be hereinafter described and claimed.

In the drawings:

Fig. 1 is a side elevational view of one form of candelabra embodying my invention, the device being shown as supported upon a flower bowl;

Fig. 2 is a view of the candelabra shown in Fig. 1, but supported upon a base ring provided therefor;

Fig. 3 is a perspective view of a modified form of candelabra embodying my invention;

Fig. 4 is a side elevational view of one of the extensible arms of the candelabra shown in Fig. 3;

Fig. 5 is a sectional view on line 5—5 of Fig. 4;

Fig. 6 is a perspective view of a further modification;

Fig. 7 is a sectional view on line 7—7 of Fig. 6;

Fig. 8 is a sectional view on line 8—8 of Fig. 6;

Fig. 9 is a sectional view on line 9—9 of Fig. 7;

Figure 10:
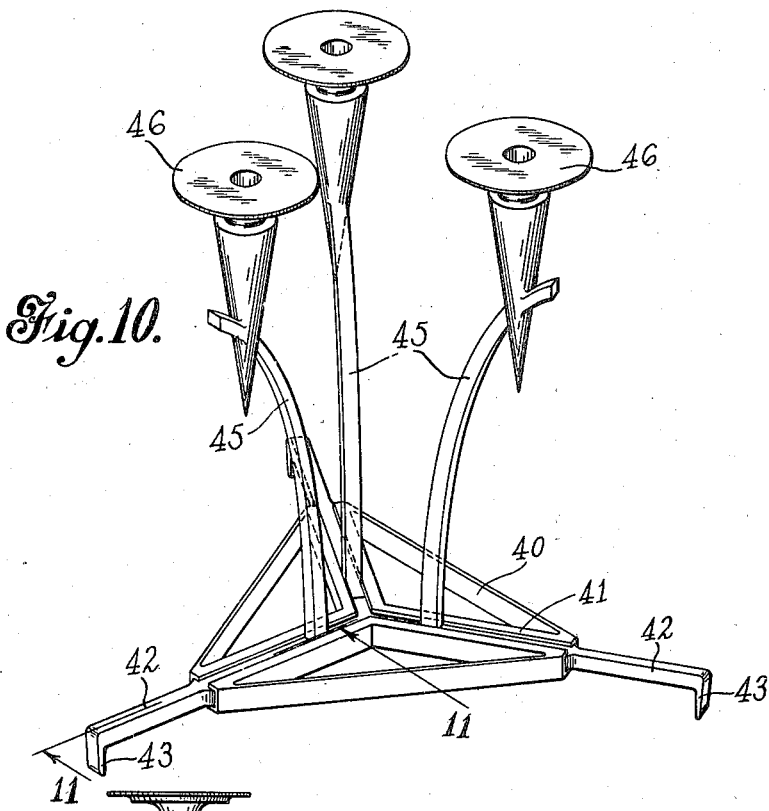
Fig. 10 is a perspective view of a further modified form of candelabra.

To illustrate one embodiment of my invention, I have shown in Fig. 1 a candelabra comprising a supporting or body portion which comprises a frame work formed of a number of rings or bands designated by the numerals 10, 11, 12, 13 and 14. As shown, these bands are approximately circular in shape, and together form the outline of a sphere. Upon certain of the bands are supported the candle sockets 15 in which are disposed the candles 16. It will be understood that the bands themselves may be secured together in any desired way, such as by soldering or welding, and likewise the candle sockets may be similarly secured to the bands.

It will be seen that as the support or frame work of the candelabra is a spherical outline, it will be adapted to partially telescope within the open upper edge 17 of a flower bowl 18, the bands contacting with the inner surface of the upper edge of the bowl and being supported therefrom with the candle sockets in upright position. It will also be obvious that a candelabra so made may be supported upon flower containers of various sizes, or even a vase, as the structure of spherical outline will merely enter or telescope into the open upper edge of the container to a more or less extent, depending upon the diameter of the container. In order that such a structure may be supported from a vase with a relatively small mouth, the bands 10 and 11 may be formed at right angles to each other, so that a four-point engagement with the mouth of the vase will result.

If it is desired to use the candelabra shown in Fig. 1 without the supporting vase or bowl, this may be done by merely providing a supporting ring 19, as shown in Fig. 2, which ring may rest upon the upper surface of a table, mantel or other support, and the candelabra will be supported from this base ring and will telescope thereinto in the same manner as is shown in connection with the bowl 18 of Fig. 1.

When the candelabra is used with a flower vase or bowl which contains flowers, the stems of the latter will project upwardly through and between the rings 10, 11, 12, 13, and 14, and will receive lateral support therefrom, so that the stems will be supported in a somewhat upright position. It will be obvious, therefore, that such a structure will provide a combined candelabra and flower holder or support.

In Fig. 3 of the drawings I have shown a modified form of candelabra which comprises a ring or "wheel" 20, provided with radially disposed members 21 and 22 extending from a point adjacent the center of the ring to the circumference. Certain of these radially disposed members are extended beyond the ring 20 and are provided upon their outer extended ends with the candle sockets 23.

If desired, the members supporting the candle sockets 23 may be made extensible, as shown in the drawings. For this purpose the members 22 may be provided with guides 24, and within these guides arms 25 are slidably mounted, the candle sockets 23 being supported upon the outer ends of these arms. With this construction the position of the candle sockets may be adjusted according to the diameter of the bowl or flower container with which the candelabra is used.

It will be understood that in the usual practice the arms 25 will rest upon the upper edge of a flower bowl or the like and support the structure therefrom, and this will be true whether or not these arms are made adjustable in length. The ring will in such case lie within the opening of the flower bowl, and the flower stems may project upwardly through the radially disposed members 21 and 22. It will be understood, of course, that there may be as many of the members 21 and 22 provided as will be desirable to support the flower stems.

In Fig. 6 of the drawings I have shown a further modification wherein crossed channel-shape members 26 and 27 are provided, and within the channels of these members are slidably supported arms 28 and 29 to be laterally adjustable to extend over and be supported by the upper edge of the flower bowl. The arms 28 and 29 may be provided with downwardly projecting lugs 30 and 31, which may be adjusted to stand in a position abutting the outer edge of the bowl 32, as shown in dotted lines in Figs. 7 and 8.

A grille or openwork structure 33 may be secured to the crossed members 26 and 27 to provide openings through which the flower stems may project. As shown, the arms 29 are somewhat longer than the arms 28 and support upon their outer ends the candle sockets 33. It will, of course, be understood that the members 28 may be likewise extended and provided with candle sockets if desired.

Figure 11:
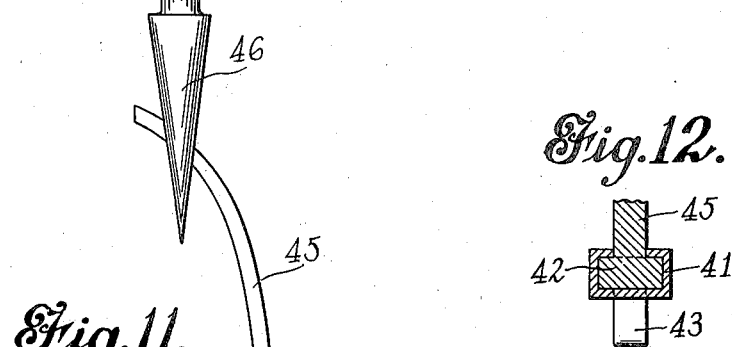
Fig. 11 is a partial sectional view on line 11—11 of Fig. 10.
Figure 12:
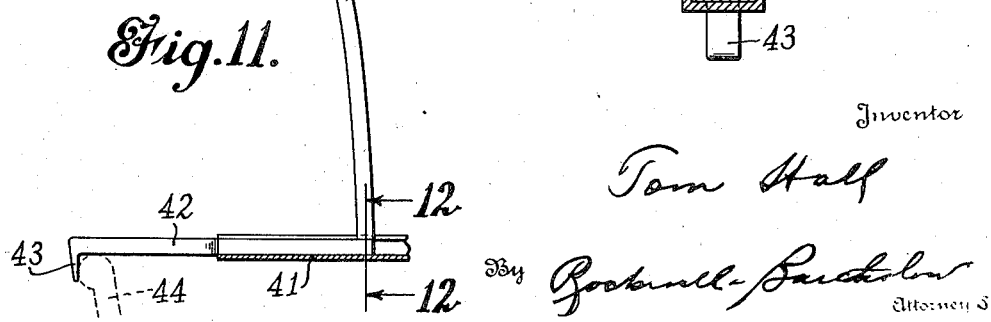
Fig. 12 is a sectional view on line 12—12 of Fig. 11.

In Figs. 10 to 12 of the drawings, I have shown a further modification wherein the candle sockets are supported adjacent the central portion of the device instead of at the outer edges thereof. As shown, this modification comprises a central structure 40 of openwork design provided with a plurality of guideways 41 within which are slidably mounted radially adjustable arms 42 having down-turned edges 43 to contact the outer edge of the bowl 44, as shown in Fig. 11. Three of such guideways and arms 42 are provided, but it will be understood that the number may be varied as desired. Adjacent the inner ends of the arms 42, standards 45 are secured to these arms, and support candle sockets 46 at their upper ends. In this instance the candle sockets are adjustable laterally away from each other with the arms 42, so that they may stand nearer to or farther from the center of the bowl as desired, or depending upon the width of the mouth of the bowl if the depending members 43 are adjusted to abut the outer side of the bowl edge. In this instance, also, the stems of the flowers within the bowl are adapted to extend upwardly within and about the members 40, so as to be given lateral support thereby.

It will, of course, be understood that in any of the modifications shown the grille or openwork plate 33 may be provided to support the flower stems, if desired.

While I have illustrated and described some preferred embodiments of my invention, it is to be understood that it is not to be limited to all of the details shown, but is capable of variation and modification within the spirit of the invention and within the scope of the appended claims.

What I claim is:

1. A candelabra comprising a supporting structure formed of a plurality of rings secured together to form a structure of spherical outline, and candle sockets secured to said members.

2. A candelabra comprising a supporting structure formed of a plurality of rings secured together to form a structure of spherical outline, candle sockets secured to said members, and a circular open-mouthed base member within which said structure telescopes to be supported and held against lateral movement thereby.

3. A candelabra comprising a central openwork supporting structure, arms extending radially from said structure and designed to support it from the upper surface of a container, and candle sockets supported on said arms.

4. A candelabra comprising a central openwork supporting structure, arms extending radially from said structure and designed to support it from the upper surface of a container, and candle sockets supported on said arms, and said arms being adjustable relative to said central structure.

5. A candelabra comprising a central openwork supporting structure, arms extending radially from said structure and designed to support it from the upper surface of a container, and candle sockets supported on said arms, and said central structure being of openwork formation whereby flower stems may extend through the openings therein.

6. A candelabra comprising a central openwork supporting structure, radially disposed arms extending outwardly from said supporting structure to support the latter from the upper surface of a container, and candle sockets supported on said arms.

7. A candelabra comprising a central openwork supporting structure, radially disposed arms extending outwardly from said supporting structure to support the latter from the upper surface of a container, and candle sockets supported upon the inner ends of said arms.

8. A candelabra comprising a central openwork supporting structure, arms extending radially from said structure and designed to support it from the upper surface of a container, and candle sockets supported on said arms, and said arms being provided with downwardly projecting lugs to engage the wall of the container.

9. A candelabra comprising a plurality of members secured together to form an openwork structure, means for supporting said structure from the upper edge of a container and securing it against lateral movement with respect thereto, in which position the openwork structure lies above the open mouth of the container to there form a support for flower stems or the like, and candle sockets supported on said structure at a substantial distance above the upper edge of the container.

10. A candelabra having an openwork body portion and candle sockets supported rigidly thereon in spaced relation to each other, and said body portion being provided with means to engage the upper rim portion of a container and support the candelabra therefrom with the candle sockets disposed above the container.

11. A candelabra comprising a supporting structure of openwork formation, means for freely supporting said structure upon the upper rim portion of a container, said structurt engaging the rim portion of the container and being held against lateral movement with respect thereto, and candle sockets supported from and above said structure, and said openwork structure being designed to support the stems of flowers or the like.

12. A candelabra comprising a plurality of candle sockets, means for supporting said sockets from and above the upper rim portion of a container, and said means being of openwork skeleton formation and comprising elongated intersecting members whereby flower stems may extend through the openings therebetween.

13. A candelabra comprising a plurality of candle sockets, means for rigidly supporting said sockets from and above the upper rim portions of containers of different diameters, said means engaging the rim of the container to be held against lateral movement with respect thereto, and comprising a frame of elongated intersecting members providing lateral support therebetween for the stems of flowers in the container.

14. A candelabra comprising a plurality of elongated intersecting members forming an openwork structure, said structure having means to engage the upper rim portion of a vessel to support the structure therefrom, candle-receiving sockets rigidly mountd on said structure, and said members being adapted to support the stems of flowers contained in the vessel, and being held against lateral movement with respect to the vessel by engagement with the rim portion thereof.

TOM HALL.